Patented Dec. 11, 1934

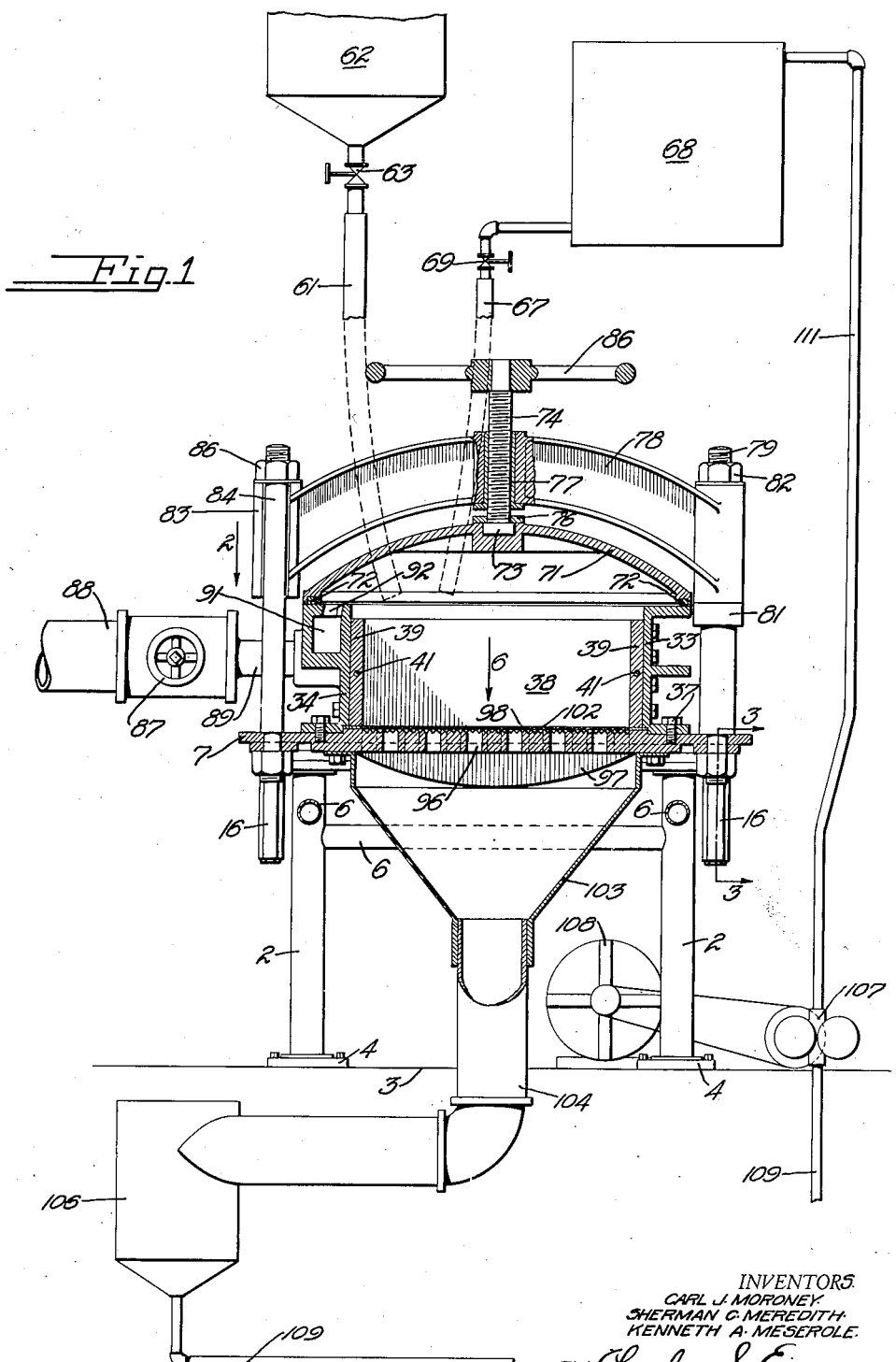

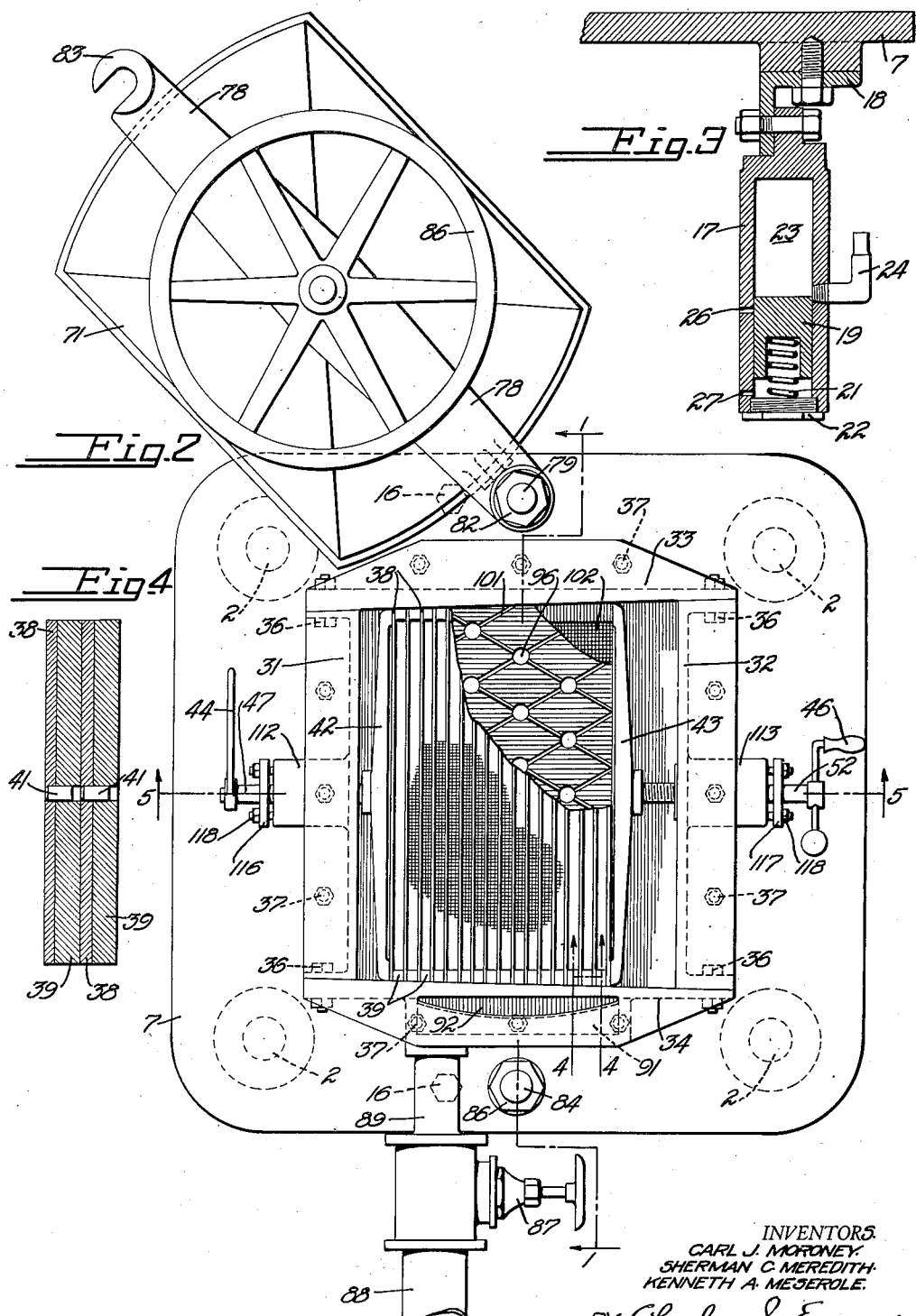

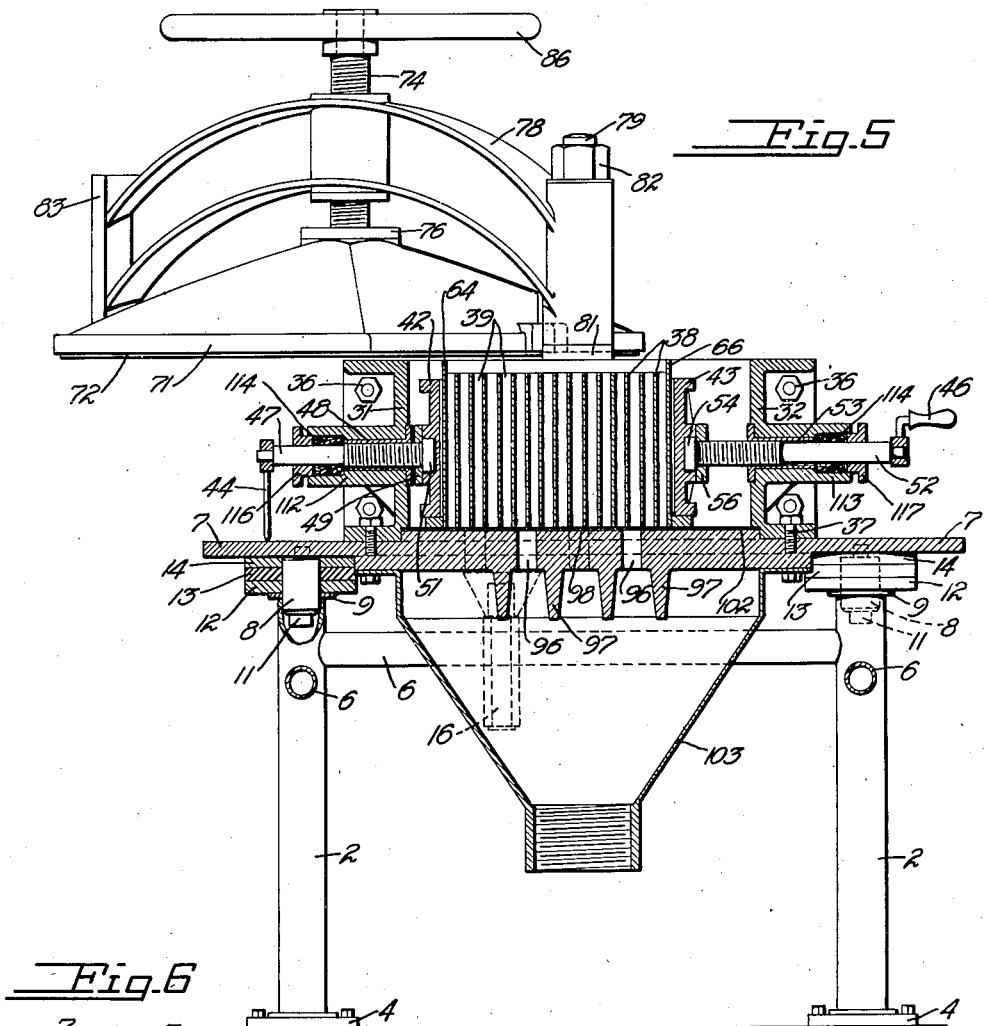

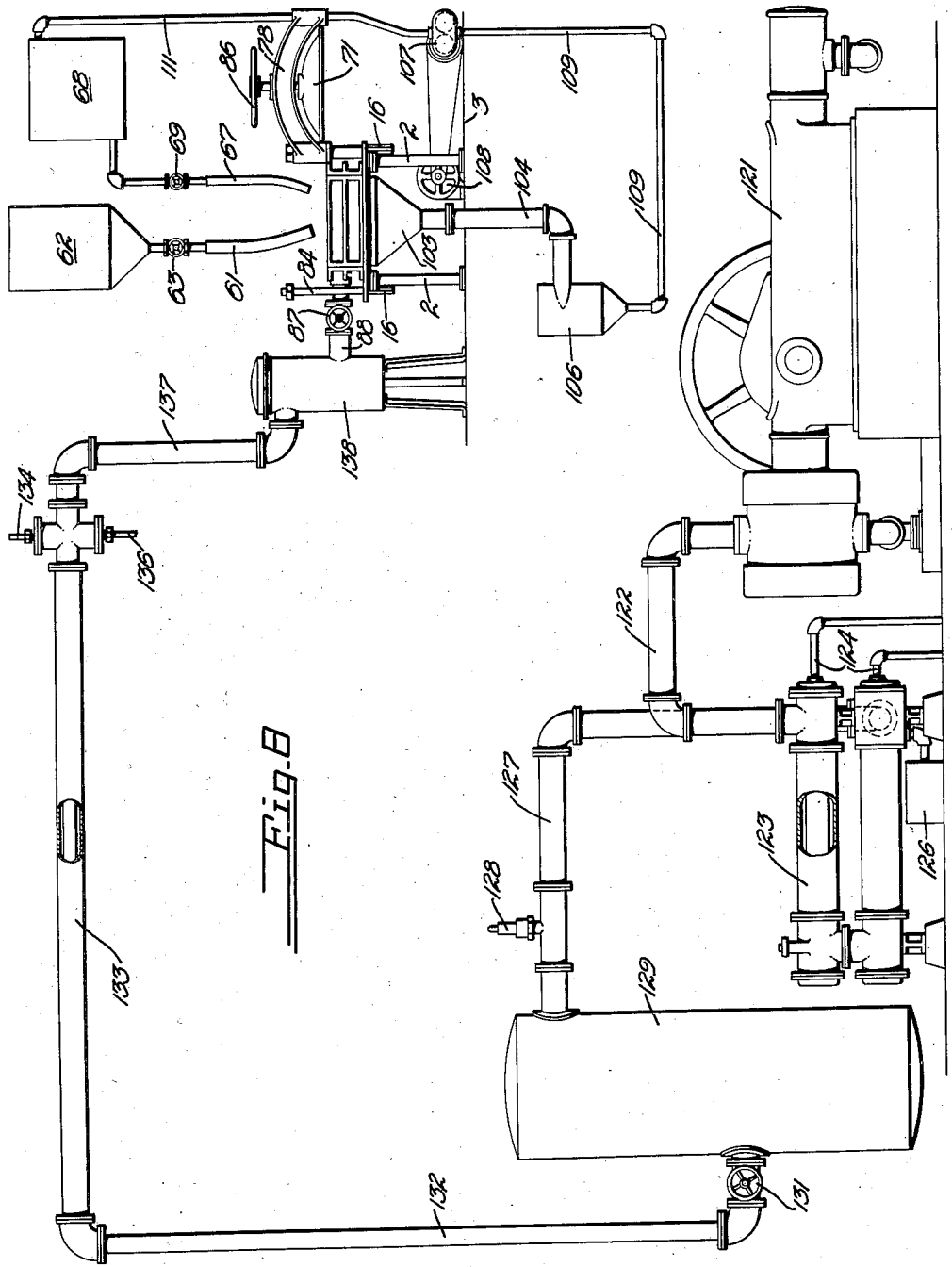

1,983,942

UNITED STATES PATENT OFFICE 1,983,942

APPARATUS FOR MOLDING MATERIALS

Carl J. Moroney and Sherman C. Meredith, San Mateo, and Kenneth A. Meserole, Burlingame, Calif., assignors to J. D. & A. B. Spreckels Investment Company, a corporation of California Application December 9, 1930, Serial No. 501,046

20 Claims. (Cl. 107—8)

Our invention relates to molding apparatus, and particularly to a machine for making slabs of sugar from granulated sugar.

An object of our invention is the provision of an apparatus that will mold and cement granular material together into an integral body of a given form.

Another object is the provision of an apparatus for making slabs or cube sugar from granulated sugar.

Another object of our invention is the provision of an apparatus, of the character described, and of economical construction.

Another object of the invention is the provision of an apparatus, of the character described, composed of few and simple parts, whereby elements may be readily installed, or removed for repair.

A further object of the invention is the provision of a molding apparatus, of the character described, requiring a minimum number of attendants.

A still further object of the invention is the provision of an apparatus and method in which the material may be molded rapidly and with great economy.

The invention possesses numerous other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings:

Figure 1 is a sectional elevation of the machine, the section being taken through the body of the machine and on a plane indicated by the line 1—1 of Figure 2. External parts of the apparatus are indicated diagrammatically.

Figure 2 is a fragmentary plan view of a portion of the apparatus looking in the direction of arrow 2 of Figure 1. Parts of the apparatus are omitted, and a portion is cut away to show the internal construction.

Figure 3 is a fragmentary sectional detail of one of the compressed air vibrators. The plane of section is indicated by the line 3—3 of Figure 1.

Figure 4 is a fragmentary sectional detail showing the manner in which the partitions and spacers are fastened together. The plane of section is indicated by the line 4—4 of Figure 2.

Figure 5 is a sectional elevation taken on the central plane of the machine as indicated by the line 5—5 of Figure 2.

Figure 6 is a fragmentary detail plan view showing the construction of the grooves and outlets in the bottom of the mold, looking in the direction of arrow 6 of Figure 1.

Figure 7 is a fragmentary sectional detail of the bottom of the mold taken on a plane indicated by the line 7—7 of Figure 6.

Figure 8 is a schematic elevation of the various elements of the apparatus.

In the manufacture of lump sugar, it has been heretofore customary to employ either one of two general methods which are called the "Crystallization" and "Direct Molding" processes. There are two typical methods employed in the crystallization process. In one of these methods, commonly known as the Adant process, the massecuite (a mixture of sugar crystals and mother syrup) is run direct from the vacuum pan into molds, in which it is permitted to remain from eighteen to twenty-four hours. During this period, some of the sucrose in the mother syrup crystallizes and cements together the crystals present in the massecuite. After these crystals have set into a crystalline mass, the mass is transferred to a centrifugal machine of special construction, where the uncrystallized portion of the mother syrup is separated from the solid sugar. A solution containing a high percentage of pure sugar in water and known as "clearing liquor" is then run into the machine and in passing thru the mass removes the adhering mother syrup. After this, the slabs of sugar are taken from the machine and placed in ovens where they are dried; and then they are cut into sugar lumps of desired size.

In the other crystallization method, known as the Hubner process, the massecuite is run into a specially constructed centrifugal machine fitted with division plates to form molds. The crystals in the massecuite fly into the divisions between the plates, while the mother liquor passes out through the perforated walls of the machine basket. Hot clearing liquor at the saturation point is then introduced; and when the hot liquor passes thru the cooler sugar in the molds, a proportion of the sugar in the clearing liquid crystallizes or hardens, thereby cementing the original crystals together. The slabs still containing moisture are then taken from the centrifugal and placed in drying ovens. After drying, the slabs are cut into lumps.

The initial step in the direct molding process consists in passing the massecuite from the vacuum pan into an ordinary centrifugal machine, wherein the mother syrup is separated from the crystals. After the sugar crystals have been washed, a small portion of clearing liquid is mixed therewith, and then the fluid mass is passed into a molding machine where it is formed into lumps of desired size by subjection to pressure effected by plungers acting in the molds of the machine. After this, the sugar is expressed from the molds and placed in ovens for drying.

From the preceding descriptions, it is seen that in all the processes described drying ovens are required. Also the crystallization processes require specially constructed centrifugal machines which are expensive, while the direct molding process employs costly molding apparatus. The time consumed in drying the sugar causes a tie-up in the production of the sugar lumps if the oven capacity of the plant is not large; and a great number of ovens involves considerable expense of installation and operation.

The apparatus and method of our invention is designed to obviate the above described disadvantages, and at the same time reduce the cost and time heretofore involved in the production of lump sugar.

In terms of broad inclusion, the apparatus of our invention comprises a molding device which forms particles of material into an integral slab. Although the apparatus can be used for molding materials generally, it is particularly adapted to manufacturing lump sugar.

In order to speed up the manufacturing process, it is desirable that a plurality of slabs be formed simultaneously; and to accomplish this the mold is built up of an outer receptacle adapted to hold a plurality of partitions between which the slabs are formed. The particles of material, such as granulated sugar, to be used in forming the slabs are introduced between the partitions and are preferably compacted by vibrating the mold to insure a close grained uniform product. A cementitious substance, which is syrup in the process selected for illustration, is then poured on top of the material between the partitions, and is forced through the granular material by a stream of fluid, such as compressed air, the continuing passage of which also serves to dry the excess moisture from the material and cement it into an integral slab. Some provision is necessary to permit the passage of the drying fluid through the mold, and in the device selected for illustration this is accomplished by sealing the top of the mold with a removable cover and introducing compressed air, which is preferably conditioned to a warm, dry state, from a suitable source of supply into the mold beneath the cover. The egress of the air and excess moisture from the mold is permitted by a suitable strainer covered aperture in the bottom of the mold, beneath the partitions, and the material held therebetween. In order to catch and save the excess syrup, that is forced from the material in the mold, a conduit is connected to the aperture and led to a suitable trap in which the syrup is collected while the air and evaporated moisture are permitted to escape.

To facilitate the removal of the slabs from the mold without fracturing them, and also to speed up the work, the side walls of the receptacle against which the ends of the partitions abut are tapered slightly so that the partitions and slabs will clear after being moved a short distance. The sides could be sloped from top to bottom, that is, being closer together at the bottom than at the top, but we prefer to slope them from side to side, which permits a mechanism that clamps the partitions together to function also to break any adherence existing between the partitions and the walls, and thus facilitate the removal of the partitions.

The ends of the slabs are also preferably protected further by having spacer bars removably attached to the ends of the partitions. These bars serve to space the partitions when they are clamped into the receptacle, prevent the ends of the slabs from coming in contact with the side walls, and also facilitate the separation of the slabs and the partitions, when the slabs are being removed from the mold.

In terms of greater detail, the apparatus of our invention, in its preferred embodiment, comprises a molding device supported on a framework such as that provided by the posts 2 secured on a base 3 by the bolted flanges 4, and braced by the cross rods 6. In order to permit the molding device proper to be vibrated and thereby effect compacting the materials within it, a platform 7 is resiliently mounted on the posts 2 to form a support for the remaining portions of the device.

A mounting providing a desirable resilience is shown in Figure 5, in which a metallic stud 8 is threaded into a suitable hole provided in the platform 7, and extends down through an aperture provided in a flange 9 fixed on top of a post 2. The depending end 11 is provided on the stud as a medium of contact for the wrench used to screw the stud in place. The stud fits inside the flange 9 loosely enough to permit free vertical movement, but prevents the platform from moving horizontally. A metallic collar 12 rests on the flange 9 and about the stud to provide support for a resilient rubber collar 13, which in turn supports a second metallic collar 14 in contact with the underside of the platform 7.

Such resilient mountings are, of course, used on each post, which renders the platform free to vibrate up and down. A vibratory force is applied to the platform by two vibrators 16 of any suitable type, such as a compressed air vibrator mechanism shown in detail in Figure 3. The cylinder 17 of the vibrator is attached to the platform 7 by a bracket 18. The vibratory motion is supplied by a piston 19, slidably mounted in the cylinder 17, and resting upon a helical spring 21 interposed between the piston and a removable end plug 22. Compressed air is supplied to a chamber 23 above the piston through a suitable connection 24. The pressure from this air forces piston 19 downward until it uncovers a port 26 in the cylinder wall; whereupon the pressure in chamber 23 is lost, and the spring 21 returns the piston upward to repeat the cycle. A second port 27, in the cylinder wall below the piston, prevents the air in the chamber beneath the piston from hindering its free motion. The piston 19 will therefore continue to move up and down as long as compressed air is supplied to chamber 23, and the vibrations thus set up are transmitted to platform 7.

In the preferred embodiment disclosed herein the mold proper is built onto the platform 7 as an integral part and comprises the two side walls 31 and 32, and the end walls 33 and 34, held together at the corners by suitable bolts 36, and held on platform 7 by screws 37. These walls provide a receptacle for a plurality of transverse and removably positioned partitions 38, extending between the end walls 33 and 34. It is between these partitions that the material is molded, and special provision is made to facilitate the removal of the partitions and molded material. The distance between end walls 33 and 34 increases gradually from side wall 31 to side wall 32, and the lengths of successive partitions are accordingly increased to obtain a moderately close fit. Partitions 38 are held in spaced positions by the spacer bars 39 which are removably held on the ends of the partitions by suitable dowels 41, as shown in Figure 4.

The group of partitions is positioned within the receptacle by the combined action of face plates or abutments 42 and 43 which may be pressed against them by actuating the external levers 44 and 46. Lever 44 is fixed on the end of a shaft 47, which is threaded through a portion of its length to engage a threaded sleeve 48 pinned within a passage provided through side wall 31. A collar 49 fixed on plate 42, holds an enlarged head 51 on shaft 47 within a suitable recess formed in plate 42. By turning lever 44 the plate 42 may be removed in or out until the partitions fit snugly between the end walls. The partitions are then clamped in position by turning crank 46 which turns a shaft 52 having a threaded portion engaging a threaded sleeve 53 pinned within a passage provided through side wall 32. An enlarged head 54 on the end of the shaft is held within a suitable recess on plate 43 by a collar 56.

When the partitions are thus inserted and clamped in the receptacle the granulated sugar is introduced between them, preferably through a flexible tube 61, which is connected to a storage bin 62. This bin is preferably mounted above the mold so that the granulated material will flow by gravity, and a valve 63, of any suitable type, is inserted in the tube circuit at a convenient point for controlling the flow. It will be noted in Figure 5, that the two outer partitions 64, and 66, extend up higher than the other partitions to prevent the materials being introduced between the partitions from overflowing.

After the particles of material, such as granulated sugar, are in the mold it is vibrated by the mechanism previously described to settle and compact the material down between the partitions. A cementitious material, which is preferably a saturated sugar syrup in the case selected for illustration, is then placed on top of the granular material, preferably by a flexible tube 67 which is connected to a supply tank 68 through a control valve 69. The molding process is then completed by forcing a stream of drying fluid, such as warm, dry compressed air, down through the material in the mold. This serves the double purpose of distributing the cementitious material throughout the interstices between the particles of granular material in the mold, and evaporating the moisture from the cementitious material to effect cementing the granular material into an integral slab.

In order to effect this passage of drying fluid a removable cover 71 is provided for the top of the mold to facilitate the entrance of the fluid into the material, and perforations are provided adjacent the bottom of the mold to permit the egress of the drying fluid, and excess syrup.

Cover 71 is adapted to fit down on suitable surfaces formed on top of the outer walls of the mold, and the joint is rendered air tight by suitable packing rings 72 inserted in slots formed about the lower edge of the cover.

The cover is held on the enlarged end 73 of a threaded shaft 74 by a collar 76 fixed to the cover. Shaft 74 engages a threaded sleeve 77 fixed in an arm 78 which is pivotally mounted on a stud 79, mounted on platform 7. A spacer sleeve 81 maintains the arm at its proper distance above the table, and a nut 82 prevents it from moving upward. The other end of the arm terminates in a hook 83 which engages a stud 84 held on the platform 7, when the cover is swung into position above the receptacle. A nut 86 on the stud prevents the hook 83, and hence the arm 78 from moving upward, when the cover 71 is pressed down onto the receptacle by turning handwheel 86 which is fixed on the upper end of shaft 74.

When the cover has been pressed into place the compressed air is turned into the mold by suitably manipulating a hand valve 87 which controls the flow of air from the supply line 88. After leaving the valve the air passes through a pipe 89 into a duct 91 formed in end wall 34, and thence out through an aperture 92 into the mold. In order that the air will have to pass through the material between the partitions the air outlet is provided in the bottom of the receptacle subjacent the partitions only.

This construction is shown in Figures 5, 6 and 7. The holes 96 are provided in the platform 7 which is preferably reinforced over this area by the flanges 97. A plurality of ridges 98 are formed on the top of platform 7 over the area to be occupied by the partitions. These ridges form the grooves 99 between them, and the grooves are in communication with the holes 96, or with the diagonal grooves 101 which are in communication with holes 96. A screen 102 is placed on the ridges to prevent the granular material between the partitions from settling into the grooves and to permit the passage of moisture and air. The air thus enters under the cover, passes down through the material between the partitions where it evaporates the excess moisture in the material, then passes through the screen, along the grooves and out through the holes 96 into a funnel shaped receiver 103 fixed on the under side of platform 7.

This funnel directs the drying fluid into a conduit 104 which terminates in a trap 106 where the gaseous fluids are permitted to escape, but the excess cementitious liquid is caught. A pump 107, driven by a motor 108, is provided to draw off the trapped cementitious liquid from trap 106, through pipe 109, whence it is forced into tank 68 through pipe 111.

In order to prevent the escape of air about the shafts 47 and 52 the stuffing boxes 112 and 113 are provided on walls 31 and 32 respectively. Suitable packing 114 is compressed in these boxes and about the shaft in the usual manner by the glands 116 and 117 which are drawn into place by the screws 118.

Drying the excess moisture from the material within the mold is greatly facilitated if the air, or other fluid, passed through the material is warm, and dry. To provide such air, conditioning apparatus such as that shown in Figure 8 is preferably employed in conjunction with the molding device proper.

An air compressor 121, of any suitable type, forces air through a pipe 122 into a heat exchanger 123, which is supplied with a refrigerant through the pipes 124. When thus cooled the moisture is condensed and precipitated from the air. It will be noted that as the pressure increases the moisture condenses (or evaporates) at higher temperatures; therefore by cooling the compressed air, the desired result can be obtained by using ordinary cooling water having a temperature of say 75° F. as the refrigerant. The condensed moisture is drained from the heat exchanger through a suitable trap 126.

After leaving the heat exchanger the cool, dry air passes through a pipe 127, in which is installed a suitable safety valve 128; into a tank 129, which damps out the pressure surges due to the compressor in the usual manner, and also provides a reserve supply of air. The air passes from tank 129 through a regulating valve 131 and a pipe 132 to a second heat exchanger 133 where it is heated by steam entering through pipe 134 and draining off through pipe 136. The air is preferably heated to say 150° F. which is well below the carmelizing point of sugar but is sufficiently warm to speed up evaporation materially.

After being heated the air passes through a pipe 137 to an oil separator 138 which is preferably employed to preclude the possibility of oil from the compressor finding its way into the mold.

To use this machine of our invention the operators first place the spacer bars 39 on the partitions 38 and then set the partitions in the mold and clamp them in place by the mechanism provided for that purpose. A charge of sugar is then introduced between the partitions and compacted by the vibrator. The syrup is then poured over the top of the sugar and the top cover 71 swung into place on the mold and clamped down.

The compressed air is then turned on and it passes in under the cover and down through the sugar to the outlet apertures carrying the excess syrup and moisture with it as it goes. This serves first to distribute the syrup throughout the mass of granular material and then to evaporate the excess moisture and solidify the syrup and the sugar into an integral slab. When the slab is sufficiently dried so that it can be handled without breaking, the air is shut off, and the cover removed.

Then to remove the slabs, the plate 43 is first backed off to permit the partitions and slabs to be broken free from the mold by moving plate 42 inward. Once the cohering bonds with the receptacle are broken, the slabs may be freed from the partitions in any suitable manner. When this is done, the spacer bars 39 are preferably loosened or removed, and the slabs freed by tapping the edges of the partitions. The loosened slabs are then lifted out, after which the partition and spacers are again clamped in the receptacle for another operation. The slabs can then be cut into pieces of any suitable size, by the usual cutting mechanism.

This apparatus of our invention is relatively inexpensive to build and operate, particularly in a plant where compressed air, steam, and cooling water are regularly available, as is the case in most sugar refineries. The machine is quite rapid in its operation, particularly if the drying air has been well conditioned. The vibrating device insures a close grained uniform product, and the mold construction permits the removal of the slabs from the machine in an unbroken condition. Furthermore, the apparatus of our invention permits the molding and drying of the sugar in one operation, since the gaseous fluid, such as the heated compressed air, is passed through till the crystals have cemented together and have dried.

We claim:

1. In a device of the character described, a mold having a pair of oppositely disposed walls, one of said walls converging toward the other, and a plurality of removably positioned partitions held between said walls.

2. In a device of the character described, a mold having a pair of oppositely disposed walls, one of said walls converging toward the other, and a plurality of removably positioned partitions of gradiently different size wedged between said walls.

3. In a device of the character described, a mold comprising a receptacle having two side walls of different lengths and two end walls fixed thereto, a plurality of bodily removable partitions adapted to fit at successive intervals between the end walls, and releasable means for holding the partitions in place.

4. In a device of the character described, a mold having a pair of oppositely disposed and converging sides, a plurality of transverse partitions removably placed between said sides, a movable abutment adjacent the nearer ends of the sides, and means for clamping the partitions against the abutment.

5. In a device of the character described, a mold comprising walls forming a trapezoidal cross section, a plurality of bodily removable partitions adapted to fit at successive intervals between the non-parallel walls and approximately parallel to the parallel walls, and releasable means for pressing the partitions toward the shorter of the parallel walls.

6. In a device of the character described, a supporting frame, a platform resiliently mounted on the frame, a mold mounted on the platform, a removable cover for the mold, a support for the cover pivotally mounted on the platform, means associated with the support for pressing the cover on the mold, and means for vibrating the platform.

7. In a device of the character described, a supporting frame, a platform resiliently mounted on the frame, a mold mounted on the platform, a removable cover for the mold, a support for the cover pivotally mounted on the platform, means associated with the support for pressing the cover on the mold, a plurality of transverse partitions in the mold and bodily removable therefrom, means for holding the partitions in spaced relationship, means for introducing particles of material between the partitions, means for introducing a cementing fluid into the material, means for effecting passage of fluid through the material between the partitions, and means for vibrating the platform.

8. A machine for forming an integral slab from syrup and particles of sugar comprising, a receptacle, a plurality of transverse partitions in the receptacle and bodily removable therefrom, means for holding the partitions in spaced relationship, means for introducing sugar and syrup between the partitions, a removable cover on the receptacle, said receptacle having an aperture therein, a plurality of ridges forming grooves subjacent the partitions and in communication with the aperture, a screen on the ridges for retaining the sugar, means for effecting passage of fluid through the sugar, the screen, and the aperture, to cement the sugar into an integral slab, and means for freeing the partitions from the receptacle.

9. A machine for forming an integral slab from syrup and particles of sugar comprising, a receptacle, a plurality of transverse partitions in the receptacle and bodily removable therefrom, means for holding the partitions in spaced relationship, means for introducing sugar and syrup between the partitions, means for vibrating the receptacle to compact the sugar, a removable cover on the receptacle, said receptacle having an aperture therein, a plurality of ridges forming grooves subjacent the partitions and in communication with the aperture, a screen on the ridges for retaining the sugar, means for effecting passage of fluid through the sugar, the screen, and the aperture, to cement the sugar into an integral slab, and means for freeing the partitions from the receptacle.

10. A machine for forming integral slabs from particles of sugar and a substance for cementing together the sugar particles, a mold having a plurality of spaced partitions therein, means for introducing the sugar and cementing substance between the partitions, and means for effecting passage of a drying fluid through the sugar and cementing substance between the partitions.

11. A machine for producing an integral body from particles of material, comprising a mold adapted to contain the material and also a fluid for cementing the material, and means for effecting the passage of heated air through the mold to distribute the cementing fluid throughout the material and to effect drying of the fluid to cement the particles together into an integral body.

12. A machine for producing an integral body from particles of material, comprising a mold adapted to contain the material and also a fluid for cementing the material, and means for effecting the passage of dried and heated air through the mold to distribute the cementing fluid throughout the material and to effect drying of the fluid to cement the particles together into an integral body.

13. A machine for producing an integral body from particles of material, comprising a mold adapted to contain the material and also a fluid for cementing the material, and means for effecting the passage of a heated gaseous fluid through the mold to distribute the cementing fluid throughout the material and to effect drying of the fluid to cement the particles together into an integral body.

14. A machine for forming an integral body from particles of sugar and a fluid for cementing together the sugar particles, comprising a mold for receiving the sugar particles and cementing fluid, means for vibrating the mold to settle and compact the sugar particles, and means for effecting the passage of compressed air through the mass in the mold to drive the cementing fluid between the compacted sugar particles.

15. A machine for forming an integral body from particles of sugar and a fluid for cementing together the sugar particles, comprising a mold for receiving the sugar particles and cementing fluid, means for vibrating the mold to settle and compact the sugar particles, and means for effecting the passage of compressed air through the mass in the mold to drive the cementing fluid between the compacted sugar particles, said latter means being adapted to effect a continued passage of the compressed air through the mass to dry the fluid and bind the particles into a solid lump.

16. A machine for forming integral slabs from particles of sugar and a substance for cementing together the sugar particles, comprising a mold having a plurality of partitions therein, means for introducing the sugar particles and cementing substance between the partitions, means for vibrating the mold to settle and compact the particles between the partitions, and means for effecting the passage of a drying fluid through the sugar and cementing substance between the partitions.

17. A machine for forming integral slabs from particles of sugar and a substance for cementing together the sugar particles, comprising a mold having a plurality of removable partitions therein, means for introducing the sugar particles and cementing substance between the partitions, means for vibrating the mold to settle and compact the particles between the partitions, and means for effecting the passage of a drying fluid through the sugar and cementing substance between the partitions.

18. A machine for producing an integral body from particles of material, comprising a mold adapted to contain the material and also a fluid for cementing the material, and means for effecting the passage of a heated gaseous fluid through the mold until the particles are cemented together into an integral body.

19. A machine for producing an integral body from particles of material, comprising a mold adapted to contain the material and also a fluid for cementing the material, and means for effecting the passage of a heated gaseous fluid through the mold to distribute the cementing fluid through the material and for effecting a continued passage of the heated gaseous fluid through the mold until the particles are cemented into an integral body.

20. A machine for forming an integral body from particles of sugar and a syrup for cementing together the sugar particles, comprising a mold for receiving the sugar particles and cementing fluid, means for compacting the particles in the mold, and means for effecting the passage of a gaseous fluid through the mass in the mold to distribute the cementing fluid throughout the compacted sugar particles.

CARL J. MORONEY.
SHERMAN C. MEREDITH.
KENNETH A. MESEROLE.